C. E. STAILEY, E. H. BLAZER AND H. W. MONSON.
TRANSMISSION MECHANISM.
APPLICATION FILED JUNE 29, 1920.
1,394,125.
Patented Oct. 18, 1921.
2 SHEETS—SHEET 2.
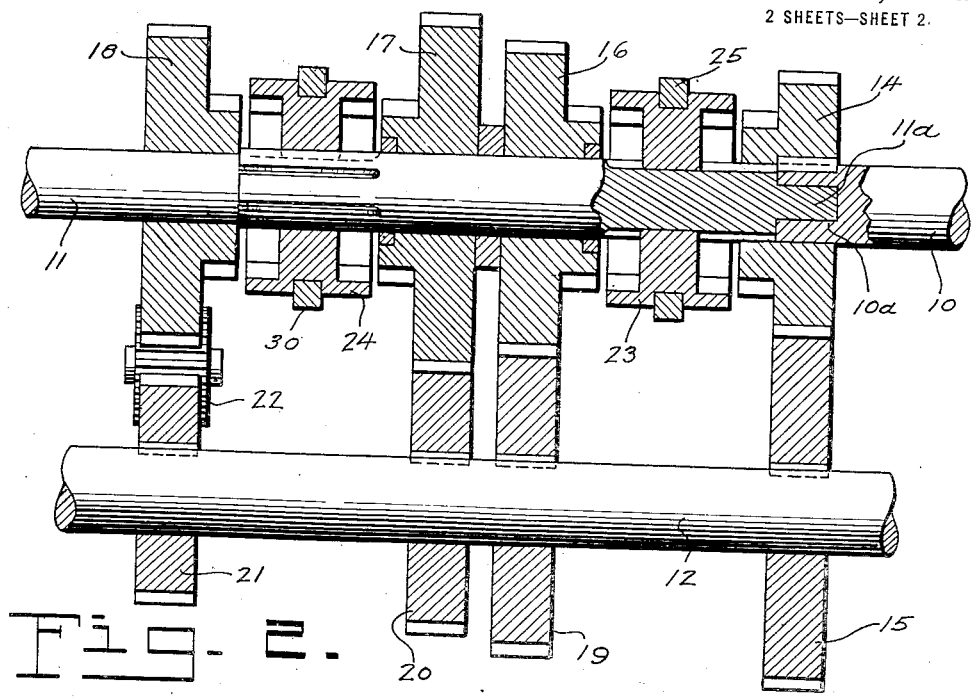
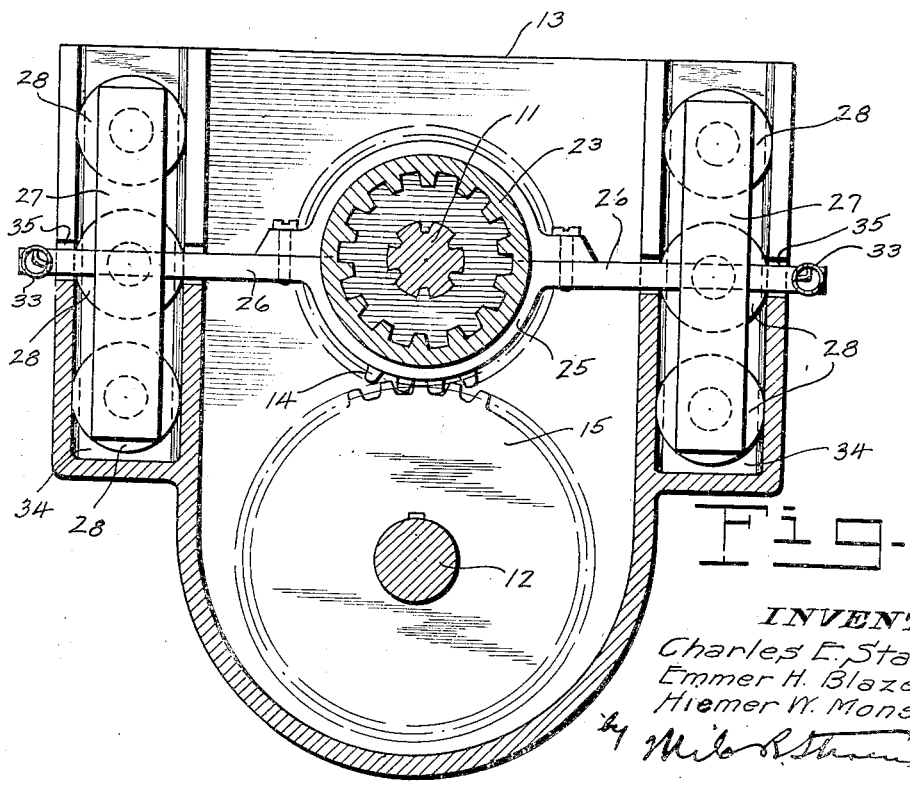
INVENTORS
Charles E. Stailey.
Emmer H. Blazer.
Hiemer W. Monson.
ATTORNEYS.

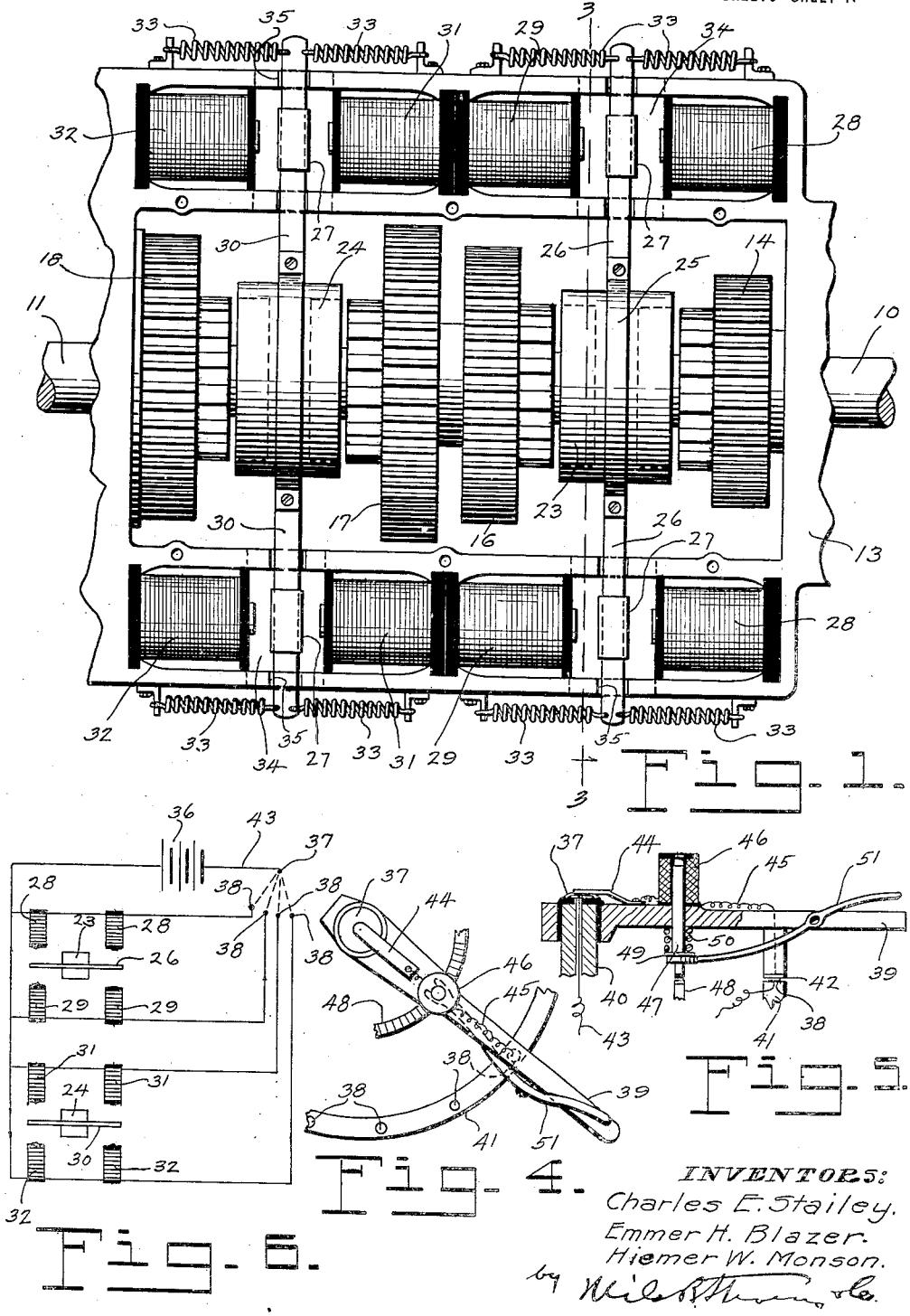

UNITED STATES PATENT OFFICE.

CHARLES E. STAILEY, EMMER H. BLAZER, AND HIEMER W. MONSON, OF PORTSMOUTH, OHIO.

TRANSMISSION MECHANISM.

1,394,125.   Specification of Letters Patent.   Patented Oct. 18, 1921.

Application filed June 29, 1920. Serial No. 392,699.

*To all whom it may concern:*

Be it known that we, CHARLES E. STAILEY, EMMER H. BLAZER, and HIEMER W. MONSON, citizens of the United States, residing at Portsmouth, in the county of Scioto and State of Ohio, have invented new and useful Improvements in Transmission Mechanisms, of which the following is a specification.

This invention relates to variable speed transmissions which are controlled by electro-responsive means, and adapted more particularly, although not necessarily so, for use in connection with motor vehicles to obtain changes in speed and direction of drive.

The invention has for its object to provide a simple and efficient electric control by which the changes in speed and the direction of the drive are effected without the gears being shifted into and out of mesh, the gears remaining in mesh at all times, and a driving connection being provided by slidable clutch members.

A further object of the invention is to provide a controlling means which assures a return of the clutch elements to neutral position before they move to effect a change of speed or direction of drive.

Other objects and advantages of the invention will be pointed out in the detailed description appearing hereinafter, and in order that the invention may be better understood, reference is had to the accompanying drawings forming a part of this specification.

In the drawings,

Figure 1 is a plan view of the change speed gear mechanism;

Fig. 2 is a central longitudinal section thereof;

Fig. 3 is a cross section on the line 3—3 of Fig. 1;

Fig. 4 is a plan view of a control lever;

Fig. 5 is an elevation of said lever, partly in section, and

Fig. 6 is a diagram showing the electric circuits.

Referring specifically to the drawings, 10 denotes the drive shaft and 11 the driven shaft of the mechanism, the two shafts being in axial alinement. The shaft 11 is shown with a reduced end portion 11$^a$ seating loosely in an axial bore 10$^a$ in the corresponding end of the shaft 10. Beneath the shafts 10 and 11, and parallel thereto, is located a countershaft 12. These shafts, and the parts associated therewith are inclosed in a housing 13 as usual, the drawings showing only the lower portion thereof.

On the shaft 10 is fastened, by a key or other means, a gear 14 which is in mesh with a gear 15 fast on the shaft 12. On the shaft 11 are loosely but non-slidably, mounted gears 16, 17 and 18, respectively. On the shaft 12 are keyed or otherwise fastened gears 19, 20 and 21. The gear 16 is in mesh with the gear 19, and the gear 17 is in mesh with the gear 20. Between the gears 18 and 21, and in mesh therewith is an idler pinion 22 to obtain a reverse drive. The gears are constantly in mesh, and as the gears 16, 17 and 18 are loose on the shaft 11, a driving connection is provided which will now be described.

On the shaft 11, between the gears 14 and 16, is slidably mounted a clutch member 23 having teeth or jaws at both ends, so that when it is slid toward the gear 14 it is locked thereto, whereas when it is slid toward the gear 16 it is locked to this gear, it being understood that these gears have side clutch teeth or jaws corresponding to those on the ends of the member 23. The clutch member 23 is normally out of mesh with the gears 14 and 16, or in neutral position, and it will be understood that said member is non-rotatably mounted on shaft 11, this being effected by fluting said shaft and having the bore of the clutch member shaped to fit the flutes. Of course, a spline or any other expedient may be employed for providing a driving connection between the clutch member 23 and the shaft 11.

Between the gears 17 and 18 is located a clutch member 24 constructed and arranged in the same manner as the clutch member 23.

As the gear 14 is fast on the drive shaft 10, and in mesh with the gear 15 fast on shaft 12, the latter shaft is constantly driven, but it does not transmit motion to shaft 11 until the clutch members 23 and 24 are shifted to effect a driving connection between the gears 16, 17 or 18 and the shaft 11.

The direct, high speed drive is obtained by sliding the clutch member 23 into engagement with the gear 14, which locks shaft 11 to shaft 10. The intermediate speed is obtained by sliding the clutch member 23 into engagement with the gear 16. The motion of shaft 10 is now transmitted through gears 14 and 15 to shaft 12, and through gears 19 and 16, and clutch member 23 to shaft 11. The low speed is obtained by sliding clutch member 24 into engagement with gear 17, the motion of the shaft 12, driven as before, being now transmitted to shaft 11 through gears 20 and 17, and clutch member 24. To obtain the reverse drive, the clutch member 24 is shifted to engage gear 18. The motion of shaft 12 is now transmitted to shaft 11 in a reverse direction through gear 21, pinion 22, gear 18 and clutch member 24.

The clutch member 23 is provided with a shifting means comprising a ring 25 seating loosely in a circumferential groove in the member, and having projecting arms 26 on diametrically opposite sides of the member. The two arms 26 each carry an armature 27 of such length as to come opposite the poles of a plurality of electro-magnets. On each side of each armature are located three magnets 28 and on the other side a corresponding number of magnets 29. It will therefore be seen that six magnets 28 are provided for pulling the clutch member 23 to the right to engage gear 14, and the same number of magnets 29 for pulling it to the left to engage gear 16. By providing a plurality of magnets, a sufficient tractive force to shift the clutch member 23 is had without the use of magnets of excessive size.

The means for operating the clutch member 24, are the same as for the clutch member 23, the shifter being shown at 30 and the two sets of magnets at 31 and 32, respectively.

To the outer ends of the shifter arms or bars 26 and 30 are connected springs 33 anchored to the housing 13. These springs are connected to opposite sides of the shifter arms and pull in opposite directions, and hence tend to return or retract the arms to normal position when the magnets are deenergized, this movement of the arms returning the clutch members 23 and 24 to neutral position.

The magnets seat in recesses 34 formed in the housing 13 and the extremities of the shifter arms 26 and 30 to which the springs are connected, pass through slots 35 in the housing side wall.

The magnets obtain current from a suitable source shown diagrammatically at 36 in Fig. 6. One side of the current source is connected to a contact 37, and from the magnets conductors extend to contacts 38. A switch is provided for connecting the contact 37 with any one of the contacts 38 to close the circuit of the selected set of magnets and thus effect the desired gear shift.

The switch aforementioned is mounted at any place convenient to the driver, and it comprises an arm 39 pivoted on a post 40 to swing above the contacts 38, the arm having a depending contact 42 positioned to engage the contacts 38. The contact 37 is at the top of the post 40, a wire 43 extending through the latter and being suitably connected to the contact. The arm 39 carries a spring finger 44 which engages the contact 37, and from said finger a conductor 45 extends to contact 42.

The switch arm or lever 39 also carries a solenoid 46 in series with the magnets, the connection being made at the conductor 45. The plunger 47 of this solenoid acts as a latch to lock the switch arm by engaging a notched plate 48. The solenoid plunger extends downward through an aperture in the switch arm and on its lower end is an abutment 49, between which latter and the bottom of the switch arm is interposed a coiled spring 50 which serves to lower or advance the plunger when the solenoid is deenergized. The switch arm 39 also carries a lever 51 engageable with the abutment 49 to elevate the solenoid plunger when the solenoid is energized.

The operation of the switch arm 39, and the parts associated therewith, is as follows:—

When the switch arm 39 is swung so that the contact 42 is off the contacts 38, the circuits of the magnets are open, and hence the clutch members 23 and 24 are in neutral position. The solenoid 46 is now also deënergized, and its plunger 47 has been forced down by the spring 50 into one of the notches of the plate 48. The switch arm is now locked. When the desired gear shift is to be made, the switch arm is swung to place the contact 42 in engagement with the proper contact 38, but before this can be done, the plunger 47 must first be lifted off the plate 48, this being done by the lever 51. As soon as the magnet circuit is closed, the solenoid is also energized and its plunger is held elevated. When a shift to another speed is to be made, the switch arm is moved to engage the contact 42 with the corresponding contact 38, but in passing from one contact 38 to the selected other one of the latter, the solenoid circuit is broken, and hence the plunger 47 is at once forced down by the spring 50 to lock the switch arm, so that before the stroke of the switch arm can be completed to make the new contact, the solenoid plunger must be lifted by the lever 51. This operation results in a sufficient time interval before the gear changes to permit the springs 33 to return the clutch members 23 and 24 to neutral position.

We claim:

1. The combination of axially alined drive and driven shafts, a countershaft, a gear fast on the drive shaft, a gear loose and non-slidable on the driven shaft, gears fast on the countershaft and in constant mesh respectively with the gears of the drive and driven shafts, a driving clutch member slidable on the driven shaft between the gear on said shaft and the gear on the drive shaft, and movable selectively into locking engagement with said gears, a shifter arm for the clutch member projecting from opposite sides thereof, a plurality of electro-magnets on opposite sides of each projecting end of the shifter arm, armatures for the magnets carried by said ends of the arm, and controlling means for the magnets on the respective sides of the arm.

2. The combination of axially alined drive and driven shafts, a countershaft, a gear fast on the drive shaft, a gear loose and non-slidable on the driven shaft, gears fast on the countershaft and in constant mesh respectively with the gears of the drive and driven shafts, a driving clutch member slidable on the driven shaft between the gear on said shaft and the gear on the drive shaft, and movable selectively into locking engagement with said gears, a shifter arm for the clutch member projecting from opposite sides thereof, a plurality of electro-magnets on opposite sides of each projecting end of the shifter arm, armatures for the magnets carried by said ends of the arm, controlling means for the magnets on the respective sides of the arm, and springs connected oppositely to the arms for moving the same to neutral position when the magnets are de-energized.

3. The combination of a slidable clutch member, a shifter arm for the clutch member projecting from opposite sides thereof, a plurality of electro-magnets on opposite sides of each projecting end of the shifter arm, armatures for magnets carried by said ends of the arm, and controlling means for the magnets on the respective sides of the arm.

4. The combination of a slidable clutch member, a shifter arm for the clutch member projecting from opposite sides thereof, a plurality of electro-magnets on opposite sides of each projecting end of the shifter arm, armatures for the magnets carried by said ends of the arm, controlling means for the magnets on the respective sides of the arm, and springs connected oppositely to the arms for moving the same to neutral position when the magnets are deënergized.

5. The combination of a slidable clutch member, electro-magnets for operating said member, an energizing circuit for the magnets, a switch in said circuit comprising a movable switch arm having a contact, and contacts engageable thereby for completing the circuit of a selected magnet, a solenoid in the circuit, means associated with the solenoid for locking the switch arm when the solenoid circuit is broken, and means for disengaging the locking means when the solenoid circuit is closed.

6. The combination of a slidable clutch member, a shifter arm for the clutch member projecting from opposite sides thereof, a plurality of electro-magnets on opposite sides of each projecting end of the shifter arm, armatures for the magnets carried by said ends of the arm, an energizing circuit for the magnets, a switch in said circuit comprising a movable switch arm having a contact, and contacts engageable thereby for completing the circuit of a selected magnet, a solenoid in the circuit, means associated with the solenoid for locking the switch arm when the solenoid circuit is broken, and means for disengaging the locking means when the solenoid circuit is closed.

In testimony whereof we affix our signatures.

CHARLES E. STAILEY.
EMMER H. BLAZER.
HIEMER W. MONSON.